US012770000B2

(12) United States Patent
Wang et al.

(10) Patent No.: US 12,770,000 B2
(45) Date of Patent: Oct. 20, 2026

(54) VERTICAL FEDERATED LEARNING WITH SECURE AGGREGATION

(71) Applicants: INTERNATIONAL BUSINESS MACHINES CORPORATION, Armonk, NY (US); Rensselaer Polytechnic Institute, Troy, NY (US)

(72) Inventors: Shiqiang Wang, White Palins, NY (US); Timothy John Castiglia, Troy, NY (US); Nathalie Baracaldo Angel, San Jose, CA (US); Stacy Elizabeth Patterson, Troy, NY (US); Runhua Xu, Pittsburgh, PA (US); Yi Zhou, San Jose, CA (US)

(73) Assignees: International Business Machines Corporation, Armonk, NY (US); Rensselaer Polytechnic Institute, Troy, NY (US)

( * ) Notice: Subject to any disclaimer, the term of this patent is extended or adjusted under 35 U.S.C. 154(b) by 1104 days.

(21) Appl. No.: 17/838,445

(22) Filed: Jun. 13, 2022

(65) Prior Publication Data

US 2023/0401439 A1 Dec. 14, 2023

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
None
See application file for complete search history.

(56) References Cited

U.S. PATENT DOCUMENTS 11,188,791 B2 11/2021 Choudhury
2017/0140272 A1* 5/2017 Goodfellow ............ G06N 3/04
(Continued)

FOREIGN PATENT DOCUMENTS

| | | | |
|---|---|---|---|
| CN | 110909865 | A | 3/2020 |
| CN | 112464290 | A | 3/2021 |
| WO | 202192977 | A1 | 5/2021 |

OTHER PUBLICATIONS

Abbas Ismail, "SplitNN-For-Vertically-Partitioned-Data", 2020, Github, https://github.com/abbas5253/SplitNN-for-Vertically-Partitioned-Data (Year: 2020).*
(Continued)

*Primary Examiner* — Ann J Lo
(74) *Attorney, Agent, or Firm* — Cantor Colburn LLP; Jordan Schiller

(57) ABSTRACT

The method provides for analyzing input and output connections of layers of a received neural network model configured for vertical federated learning. An undirected graph of nodes is generated in which a node having two or more child nodes includes an aggregation operation, based on the analysis of the model in which a model output corresponds to a node of the graph. A layer of the model is identified in which a sum of lower layer outputs are computed. The identified model layer is partitioned into a first part applied respectively to the multiple entities and a second part applied as an aggregator of the output of the first part. The aggregation operation is performed between pairs of lower layer outputs, and multiple forward and backward passes of the neural network model are performed that include secure aggregation and maintain model partitioning in forward and backward passes.

17 Claims, 4 Drawing Sheets

(56) References Cited

U.S. PATENT DOCUMENTS

| | | | | |
|---|---|---|---|---|
| 2020/0279151 | A1* | 9/2020 | Li | G06F 16/9024 |
| 2020/0285892 | A1* | 9/2020 | Baum | G06F 18/285 |
| 2021/0073678 | A1 | 3/2021 | Chu | |
| 2021/0150037 | A1* | 5/2021 | Radhakrishnan | G06N 20/00 |
| 2021/0174243 | A1 | 6/2021 | Baracaldo | |
| 2021/0304062 | A1 | 9/2021 | Rajamoni | |
| 2021/0409197 | A1 | 12/2021 | Baracaldo | |

OTHER PUBLICATIONS

Cilimkovic, Mirza. "Neural networks and back propagation algorithm." Institute of Technology Blanchardstown, Blanchardstown Road North Dublin 15.1 (2015): 18. (Year: 2015).*

Xu, Runhua, James Joshi, and Chao Li. "NN-EMD: Efficiently training neural networks using encrypted multi-sourced datasets." IEEE Transactions on Dependable and Secure Computing 19.4 (2021): 2807-2820. (Year: 2021).*

Xu, Runhua, et al. "Fedv: Privacy-preserving federated learning over vertically partitioned data." Proceedings of the 14th ACM workshop on artificial intelligence and security. 2021. (Year: 2021).*

Camuto, A., Willetts, M., Simsekli, U., Roberts, S. J., & Holmes, C. C. (2020). Explicit regularisation in gaussian noise injections. Advances in Neural Information Processing Systems, 33, 16603-16614. (Year: 2020).*

Feng, R., Zhao, D., & Zha, Z. J. (Jul. 2021). Understanding noise injection in gans. In international conference on machine learning (pp. 3284-3293). PMLR. (Year: 2021).*

Ng , A., Nglam , J., Foo, C. Y., Mai , Y., Suen , C., Coates, A., Maas, A., Hannun, A., Huval, B., Wang, T., & Tandon, S. (Nov. 28, 2018). Multi-Layer Neural Network. Unsupervised feature learning and Deep Learning Tutorial. http://deeplearning.stanford.edu/tutorial (Year: 2018).*

Nie, G. Y., Cheng, M. M., Liu, Y., Liang, Z., Fan, D. P., Liu, Y., & Wang, Y. (2019). Multi-level context ultra-aggregation for stereo matching. In Proceedings of the IEEE/CVF conference on computer vision and pattern recognition (pp. 3283-3291). (Year: 2019).*

Bonawitz et al., "Practical secure aggregation for privacy-preserving machine learning", In proceedings of the 2017 ACM SIGSAC Conference on Computer and Communications Security (pp. 1175-1191), Oct. 2017.

No Author. "Zoom Introduces Contact Center Business Intelligence, Connecting Data Silos to Help with Strategic Decision-Making", Zoom International, Jan. 25, 2016, 4 Pages.

* cited by examiner

VERTICAL FEDERATED LEARNING WITH SECURE AGGREGATION

BACKGROUND

The present invention relates to data protection and security, and more specifically to a secure aggregation of data in vertically partitioned federated learning.

Federated learning provides a distributed model training technique utilizing decentralized data. The use of decentralized data reduces the communication and storage requirements of applications and models operating in cloud environments. Vertical Federated Learning (VFL) may apply to cases in which data sets share the same identity space (users, companies, etc.) but differ in the feature space or the data types included in respective data sets. Vertically Federated Learning aggregates the different features and computes the training loss and gradients to build a model from collaborative data sets from different sources.

Data features are often partitioned across multiple clients without significant overlap. For example, a bank and an insurance company may include different features in their respective data sets of the same user and the combination of features may be useful in predicting a credit rating. Participating parties in the training of a VFL model benefit from a collaborative strategy, but also desire the privacy of respective data sets and are typically reluctant to share or expose raw data.

SUMMARY

According to an embodiment of the present invention, a computer-implemented method, computer program product, and computer system are provided for training a neural network model using vertical federated learning. The method provides for one or more processors to analyze input and output connections of layers of a neural network model that is received, wherein the neural network model is structured to receive input from vertically partitioned data sources across multiple entities. The one or more processors generate an undirected graph of nodes in which a node having two or more child nodes includes an aggregation operation, based on the analysis of the neural network model in which an output of the neural network model corresponds to a node of the graph. The one or more processors identify a layer of the neural network model in which a sum of lower layer outputs is computed. The one or more processors partition the identified model layer into a first part applied respectively to the multiple entities and a second part applied as an aggregator of the output of the first part. The one or more processors perform the aggregation operation between pairs of lower layer outputs and the one or more processors perform multiple forward and backward passes of the neural network model including secure aggregation and maintaining partitions in the forward and backward passes.

DETAILED DESCRIPTION

Figure 1:
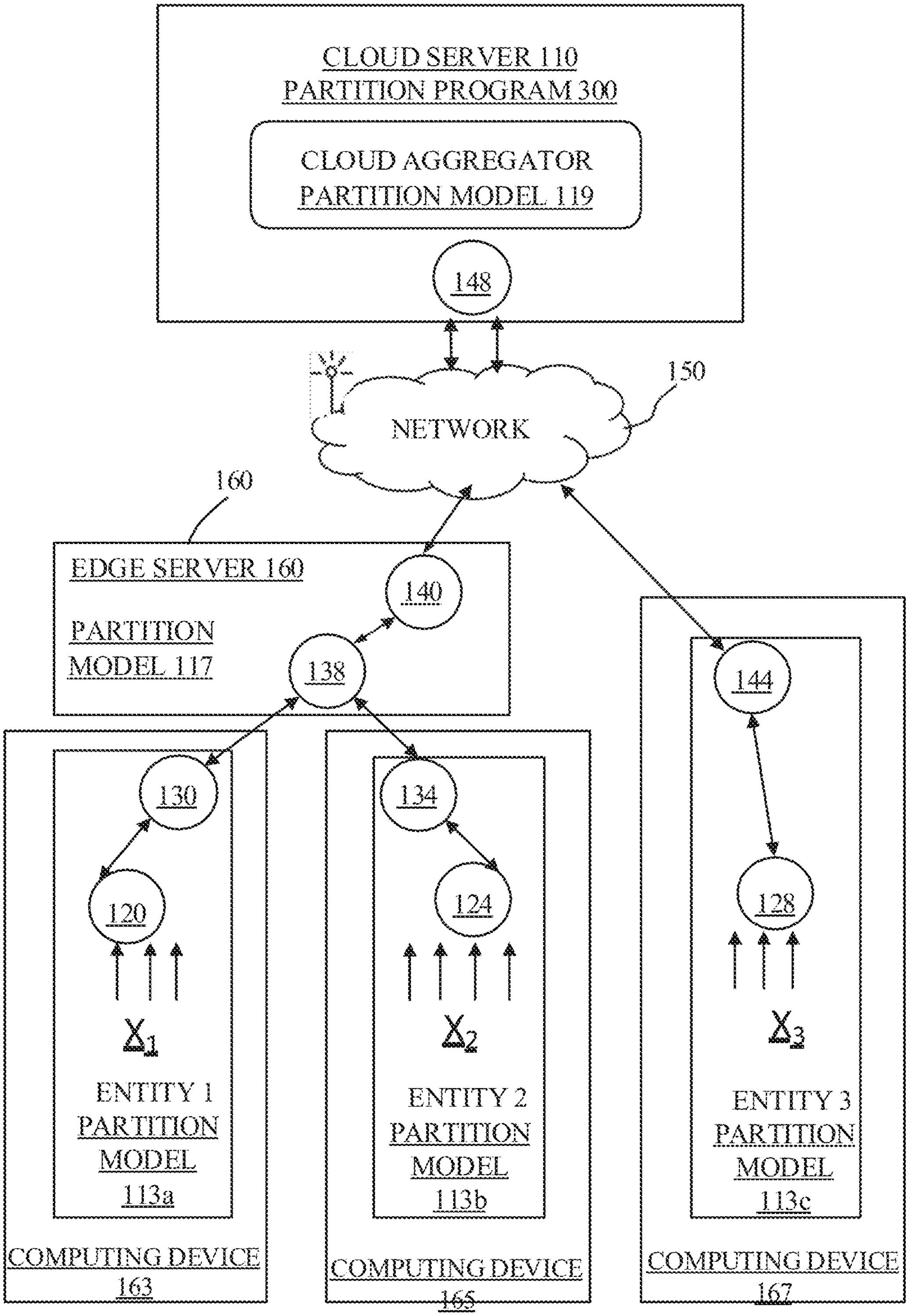
FIG. 1 is a functional block diagram illustrating a distributed data processing environment, in accordance with an embodiment of the present invention.

Embodiments of the present invention recognize that improvement of the accuracy and effective predictability of a model depends, at least in part, on the amount and diversity of feature data available for training of the model. Embodiments also recognize that independent data silos may exist among multiple distinct entities collecting feature data that relates or contributes to the model prediction output, where an entity can be, for example, a company, an organization, an element of government at local, state, or federal level, or other such data-collecting groups. Often, reduced model performance results from an inadequate volume and variation of training data, which may be related to reluctance to exchange or share feature data among the multiple entities that wish to protect and keep private the raw feature data collected. In some embodiments, entities avoid sharing data even among sub-levels within the same entity. Embodiments recognize the importance of the security of an entity's data while acknowledging the benefits of collaboratively training the model. Collaborative training of models often includes the use of aggregated data from multiple entity sources benefiting the individual sources by training an improved predictive artificial intelligence (AI) model. Additionally, embodiments acknowledge the possibility of leaks of raw information as embeddings are exchanged between the entities and an aggregating server, and the desire among the entities to avoid the exposure of their respective data sets.

Embodiments recognize, however, that existing approaches are effective for additive operations of model parameters, such as for horizontal federated learning (HFL), which is not the case for VFL. HFL among multiple entities involves training the model on data from a common feature space and includes sharing of model parameters generated by respective entities from performing local training of the model on respective local data. The shared parameters may include weights assigned to feature inputs but the raw data sets of the respective entities participating in the HFL used in the training of the local model are not shared. Secure aggregation techniques can be applied to prevent leakage or reconstruction of input data. VFL only shares results computed by intermediate layers of the model that are computed using raw feature data, which differs from the actual raw feature data. VFL requires the use of embeddings from the participating entities for the training of the model to receive the benefit of improved model predictability, but due to the differences in parameter updates in HFL and VFL, current methods do not provide a means of applying secure aggregation in VFL.

Embodiments of the present invention provide a computer-implemented method, computer program product, and computer system for training a neural network model using federated learning of vertically partitioned data across multiple local entities preventing individual embeddings of each entity from being extracted by the aggregator or other entities. Aspects of the invention include receiving a neural network model as input and partitioning the model onto the respective entities and an aggregator. Embodiments determine and perform a particular partitioning of the neural network model that enables secure aggregation. In some embodiments, the received neural network model may have multiple different input branches and one output branch. For example, the neural network model may be received from a user having skill in neural network model building and application of models for predictability purposes, which may include certain data scientists.

Another aspect of the invention includes analyzing the neural network model to determine the points of data aggregation and building an undirected graph based on the input and output connections determined from the analysis of the neural network layers. For example, the embodiments may determine that the local entities include three sets of inputs, and each set of entity inputs includes four feature inputs and result in one output. Embodiments determine the local outputs of each entity participating in the training of the model, the aggregation points formed between two or more local outputs, and the point of aggregation between the aggregated local outputs and the output of the next entity. Embodiments continue determining aggregation points until all entity outputs have been included in an aggregation operation corresponding to a node of the generated undirected graph.

Embodiments of the present invention refer to an embedding of the neural network model as a low-dimensional vector representation that captures relationships in higher dimensional input data. Embeddings make it easier to perform machine learning on large inputs like sparse vectors representing words. Distances between embedding vectors capture the similarity between different data points and can capture essential concepts in the original input. Ideally, an embedding captures some of the semantics of the input by placing semantically similar inputs close together in the embedding space. An embedding in the context of VFL means a result computed by an intermediate layer of the model, such that computation performed on the input of raw data produces a result that differs from the raw data features. To address data security, methods of secure aggregation may be applied to mask the exact embeddings received by the application performing the data aggregation operations of the neural network model on a server, such as a cloud-based server. A random agreed-to sequence between pairs of entities can be added as a noise factor to the embeddings (i.e., the output of intermediate layers of the model) in which one entity adds a noise factor to the output and the other entity of the pair subtracts the noise factor, for example, effectively canceling out the noise factor during aggregation but preventing awareness of exact values submitted for aggregation. In some embodiments of the present invention, advanced methods exist in which entities do not need to be grouped into pairs.

The operations of the neural network model used in VFL can be described as an undirected graph. The nodes of the undirected graph represent the connections in the neural network with more than one child node and include an aggregation operation. Embodiments partition neural network layers corresponding to the undirected graph nodes with more than one child into local (i.e., entity) and aggregator components. For example, a node of the neural network receives feature data as four separate inputs of a first entity of a plurality of three entities. A similar node receives feature data input from each of the other two entities. The node may apply weighted factors to input feature data and perform an activation function on the input and produce a summarized output.

An aspect of the invention partitions the neural network model and a first partition (i.e., sub-model) is applied to respective entities, which receives local input data of the respective entity for training, applies trainable model parameters, applies an activation function, and produces one or more outputs. The output of partitioned models of two entities becomes inputs for a first aggregation connection corresponding to an aggregation node of the generated undirected graph. The output of the first aggregation connection is paired with the output of a partitioned model of a third entity, thus forming a second aggregation connection. The output of the second aggregation connection is paired with the output of the partitioned model of the fourth entity to form a third aggregation connection, and so on until a pairing provides model input to an aggregation connection at the aggregation (e.g., cloud) server. In each aggregation connection pairing, at least one of the pairs corresponds to a node of the undirected graph having more than one child node.

At each of the aggregation connections, secure aggregation techniques are applied which, along with the partitioning of the neural network layers, result in aggregated data and enable the protection of entity-specific input data. The nodes of the undirected graph represent local computations, and the nodes with two or more child nodes represent aggregation operations of the model. Partitioning identifies single building blocks (nodes) of the model that sums the outputs of all preceding building blocks, and the initial preceding blocks of the model correspond to the local entities. In some embodiments of the present invention, the automatic partitioning of the model includes decomposing the single building block such that the first part includes computing a partial matrix product on the preceding building block's output associated with each entity and the second part includes computing a sum of the result from the first part followed by additional computation, such as an activation function.

Aspects of the invention include a backpropagation operation in which the aggregator server computes the partial derivative of a loss function that is sent locally to the entities for additional computation. Embodiments of the present invention identify one layer of the neural network model that computes the sum of all the lower layer outputs and partitions the layer into two parts. The first partition is placed on the local entity and includes block-wise multiplication of the output of the lower layers with a weight matrix. The second partition is placed on the aggregator and includes computing the sum of the block-wise multiplication results followed by an activation function.

Embodiments of the present invention train the neural network model using local data of the entities while preserving the partitioning of the model. The neural network training process involves multiple forward and backward passes with secure aggregation in place that prevents individual embeddings at each party from being extracted by the aggregator or other parties. The forward passes compute the sum of the block-wise multiplication results and include using secure aggregation that adds noise to input data, which renders the individual embeddings of respective entities as unknown to the aggregator and the other entities in the current and subsequent steps, including backward passes. Embodiments of the present invention enable only the aggregated values of embeddings to be known, protecting the raw embedding values and sources.

Aspects of the invention partition the neural network layers to correspond with the nodes of the undirected graph having more than one child node. The nodes of the undirected graph represent aggregation operations of the model. Partitioning identifies single building blocks (nodes) of the model that sums the outputs of all preceding building blocks, and the initial preceding blocks of the model correspond to the local entities. In some embodiments of the present invention, the automatic partitioning of the model includes decomposing the single building block such that the first part includes computing a partial matrix product on the preceding building block's output associated with each entity and the second part includes computing a sum of the result from the first part followed by additional computation, such as an activation function.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes cloud server 110, edge server 160, computing device 163, computing device 165, and computing device 167, all interconnected via network 150. Distributed data processing environment 100 also includes a partition of neural network model 113*a*, 113*b*, and 113*c*, applied to entity 1, entity 2, and entity 3, operating on computing devices 163, 165, and 167, respectively. Distributed data processing environment 100 also includes a partition of the neural network model designated as partition model 117, operating on edge server 160, and a partition of the neural network model operating on cloud server 110, designated as partition model 119. FIG. 1 illustrates partition model 113*a* as operating on computing device 163, partition model 113*b* as operating on computing device 165, and partition model 113*c* as operating on computing device 167. Computing devices 163, 165, and 167 correspond to entities 1, 2, and 3, respectively.

FIG. 1 includes inputs $X_1$, $X_2$, and $X_3$, to partition models 113*a*, 113*b*, and 113*c*, respectively, which contain raw feature data of entity 1, entity 2, and entity 3, respectively. FIG. 1 depicts outputs 120, 124, and 128, which result from the processing of inputs $X_1$, $X_2$, and $X_3$ by partition models 113*a*, 113*b*, and 113*c*. In some embodiments, outputs 120, 124, and 128 may be a single data output, whereas, in other embodiments, outputs 120, 124, and 128 may be two or more data outputs. In some embodiments, partition models 113*a*, 113*b*, and 113*c* modify outputs 120, 124, and 128, respectively, adding trainable weighting parameters to generate inputs 130, 134, and 144, respectively. Similarly, partition model 117 modifies output 138 with weighted parameters to generate input 140 from edge server 160 to partition model 119. Output 148 results from partition model 119 performing aggregation operations on received input via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support data transmission and communications of edge server 160, and computing device 167 with cloud server 110. In some embodiments, computing devices 163, 165, and 167 communicate and transmit data to and receive data and communication from cloud server 110 in the absence of edge server 160 (not shown).

Cloud Server 110 is depicted as including partition program 300 and partition model 119. In some embodiments, cloud server 110 can be a laptop computer, a desktop computer, a mobile computing device, a smartphone, a tablet computer, or other programmable electronic device or computing system capable of receiving, sending, and processing data. In other embodiments, cloud server 110 may be a stand-alone computing device interacting with applications and services hosted and operating in a cloud computing environment. In still other embodiments, cloud server 110 may be a blade server, a web-based server computer, or be included in a computing system utilizing clustered computers and components (e.g., database server computers, application server computers, etc.) that act as a single pool of seamless resources when accessed within distributed data processing environment 100. In yet other embodiments, cloud server 110 can be a netbook computer, a personal digital assistant (PDA), or other programmable electronic devices capable of receiving data from and communicating with cloud server 110. In some embodiments, cloud server 110 remotely communicates with edge server 160 and computing devices 163, 165, and 167 via network 150. Cloud server 110 may include internal and external hardware components, depicted in more detail in FIG. 4.

Partition program 300 receives a neural network (NN) model to be trained using vertical federated learning (VFL). Partition program 300 performs an analysis on the NN model determining inputs and outputs forming connections between layers and generates an undirected graph of nodes in which each node that includes two or more child nodes includes an aggregation operation. Partition program 300 determines connections of nodes of the undirected graph corresponding to inputs and outputs of the NN model. In an embodiment of the present invention, partition program 300 identifies a layer (or layers) of the NN model in which a single building block of the model computes a sum of the preceding building blocks from lower layer outputs, which are received as inputs. Partition program 300 partitions the identified model layer into two parts.

A first partition receives inputs and includes trainable parameters from the multiple entities participating in the vertical federated learning of the NN model. A second partition receives the outputs of the first part and/or a combination of the aggregated output of at least a pair of entities and an output of at least an additional entity of the multiple entities and performs an aggregation operation. Partition program 300 performs multiple forward and backward passes of the NN model, preserving the partitioning of the NN model. The forward and backward passes of the NN model processing training data include the use of secure aggregation techniques in which noise terms are added using a coordinated random sequence communicated through a secure channel, such as "HTTPS" between pairs of entity computing devices. By summing the coordinated sequence of noise to a feature data element of one entity with the noise term applied to a feature data element of a second entity, the noise terms cancel out and the receiving aggregator computes the aggregation without being able to determine the actual input values from the entity pair.

Partition model 119 operates within cloud server 110 as a cloud-based aggregator partition of the NN model. In some embodiments, partition model 119 receives input that includes aggregated data from at least a pair of aggregated entity data and output from a third entity. For example, partition model 119 receives input 140 from edge server 160, which includes output 120 and output 124 from entity 1 and entity 2. Outputs 120 and 124 receive trainable model parameters resulting in input 130 and input 134 and partition model 117, operating on edge server 160, performs an aggregation operation producing output 138. Output 138 and output 128 receive model trainable parameters that produce input 140 and input 144 to partition model 119, via network 150, which performs an aggregation operation resulting in output 148. The architecture and weights applied to partition model 119 may be different than those of partition model 117 because the models belong to different partitions, however, both partition models perform aggregation operations.

Partition model 117, for example, performs an aggregation operation resulting in output 138. Partition model 117 receives input 130 and input 134, which include trainable parameters added to output 120 and 124, respectively. Output 120 and output 124 result from partition model 113*a* and partition model 113*b* performing operations on input $X_1$ and input $X_2$, which correspond to feature data from entities 1 and 2, respectively. Partition model 117 and partition model 119 are different parts of the overall model having architectures and weights that may be different, however, both include aggregation operations. The architecture and weights applied to partition model 117 may be different than those of partition model 119 because the models belong to different partitions, however, both partition models perform aggregation operations.

Edge server 160 represents intermediary servers that perform model partition operations, which may be effective in aggregation computations of output pairs for large numbers of entities participating in VFL training of the model. In some embodiments, the number of entities participating may not require the use of edge servers performing aggregation operations with model partitions.

Computing devices 163, 165, and 167 include a copy of a partition of a layer of the neural network model. FIG. 1 depicts the respective partitions as partition models 113*a*, 113*b*, and 113*c*, corresponding, respectively, to computing devices 163, 165, and 167. Computing devices 163, 165, and 167 perform operations of partition models 113*a*, 113*b*, and 113*c*, receiving inputs $X_1$, $X_2$, and $X_3$ that include feature data from data repositories of entity 1, entity 2, and entity 3, respectively, accessed by computing devices 163, 165, and 167. Computing devices 163, 165, and 167 may include internal and external hardware components, depicted in more detail in FIG. 4.

Figure 2:
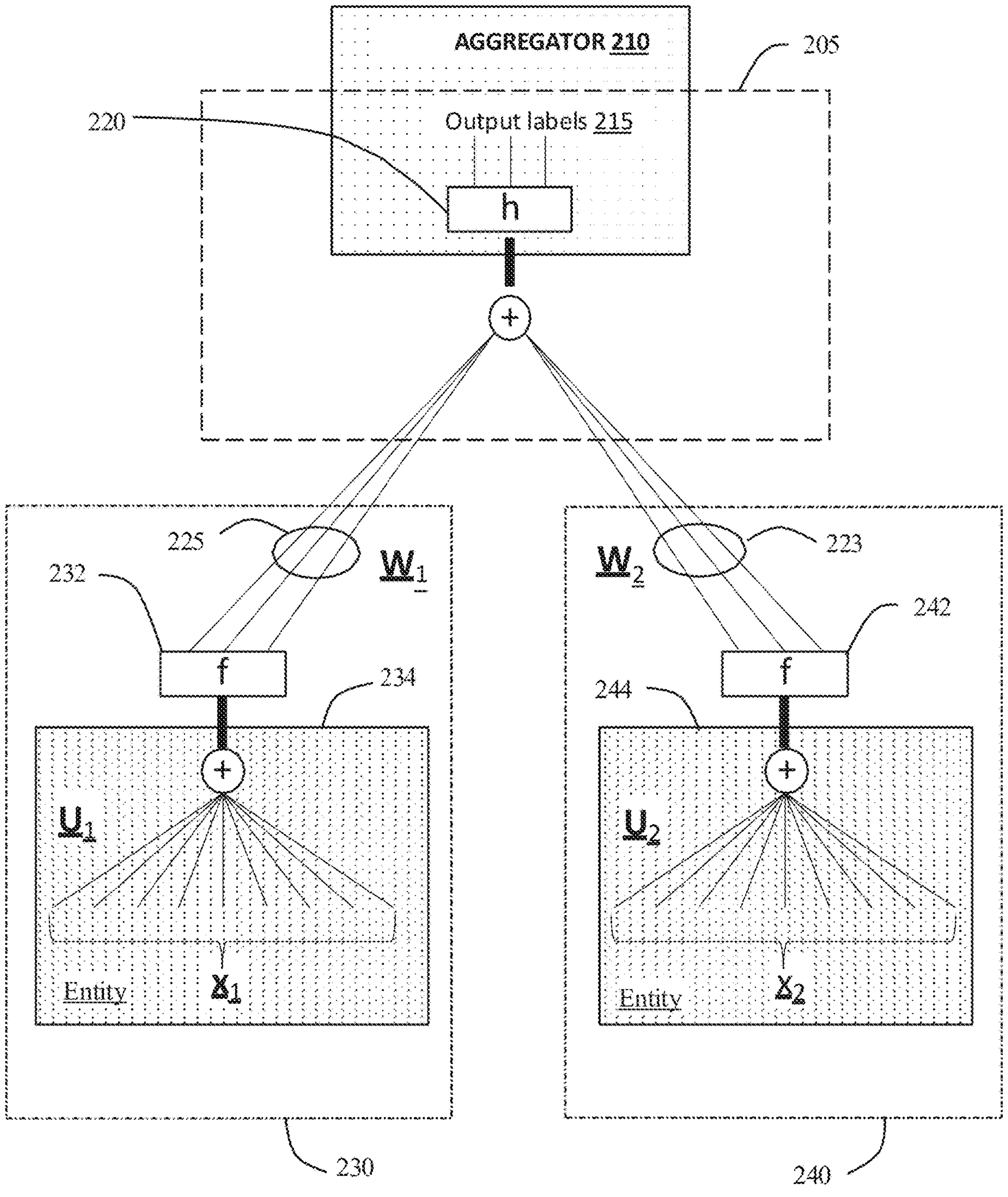
FIG. 2 is a functional block diagram depicting a partitioned neural network model, in accordance with an embodiment of the present invention.

FIG. 2 is a block diagram depicting a partitioned neural network model, in accordance with an embodiment of the present invention. FIG. 2 depicts an example of a partition of a single neural network layer across a server-based aggregator and multiple local entities. Without partitioning, each entire layer of the neural network performs aggregation functions either entirely located at the server-based aggregator or one of the participating entities. By performing the partitioning of a layer of a neural network model in the FIG. 2 example, the input to the server-based aggregator includes the sum of all entity outputs, which allows applying secure aggregation on the local entities' outputs (embeddings) enabling secure vertical federated learning for training the neural network model. The partitioning of the neural network layer distinguishes embodiments of the present invention from existing implementations that treat a neural network layer as a single item.

FIG. 2 includes model partition 205, model partition 230, model partition 240, and aggregator 210. Aggregator 210 is a component of partition program 300 and performs an aggregation operation on input 225 from entity 234 and input 223 from entity 244. $W_1$ and $W_2$ are trainable parameters that function as weights applied to input 225 and input 223, respectively, and activation function 220 (*h*) performs a function defining output labels 215.

Partitioning the neural network model results in model partition 205, model partition 230, and model partition 240. Model partitions 230 and 240 receive input data from entity 234 and entity 244, respectively. Model partition 230 receives input X1 data from entity 234 and model partition 240 receives input X2 data from entity 244. Trainable parameters U1 and U2 apply weights to the different inputs X1 and X2, respectively. Activation functions 232 and 242 perform a function defining the output of model partitions 230 and 240, respectively. The partitioning of the NN model occurs at layers that enable computing intermediary output at the entity level and a summary of the intermediary output at the aggregator level. The partitioning of the model enables secure aggregation techniques to be applied, such as adding a noise factor to the input to the aggregation operation. The noise factors are included in a collaborative manner between input entities such that the noise factors cancel out and the aggregator has only awareness of the sum of intermediary data, preventing decoding of the input data associated with an entity.

Figure 3:
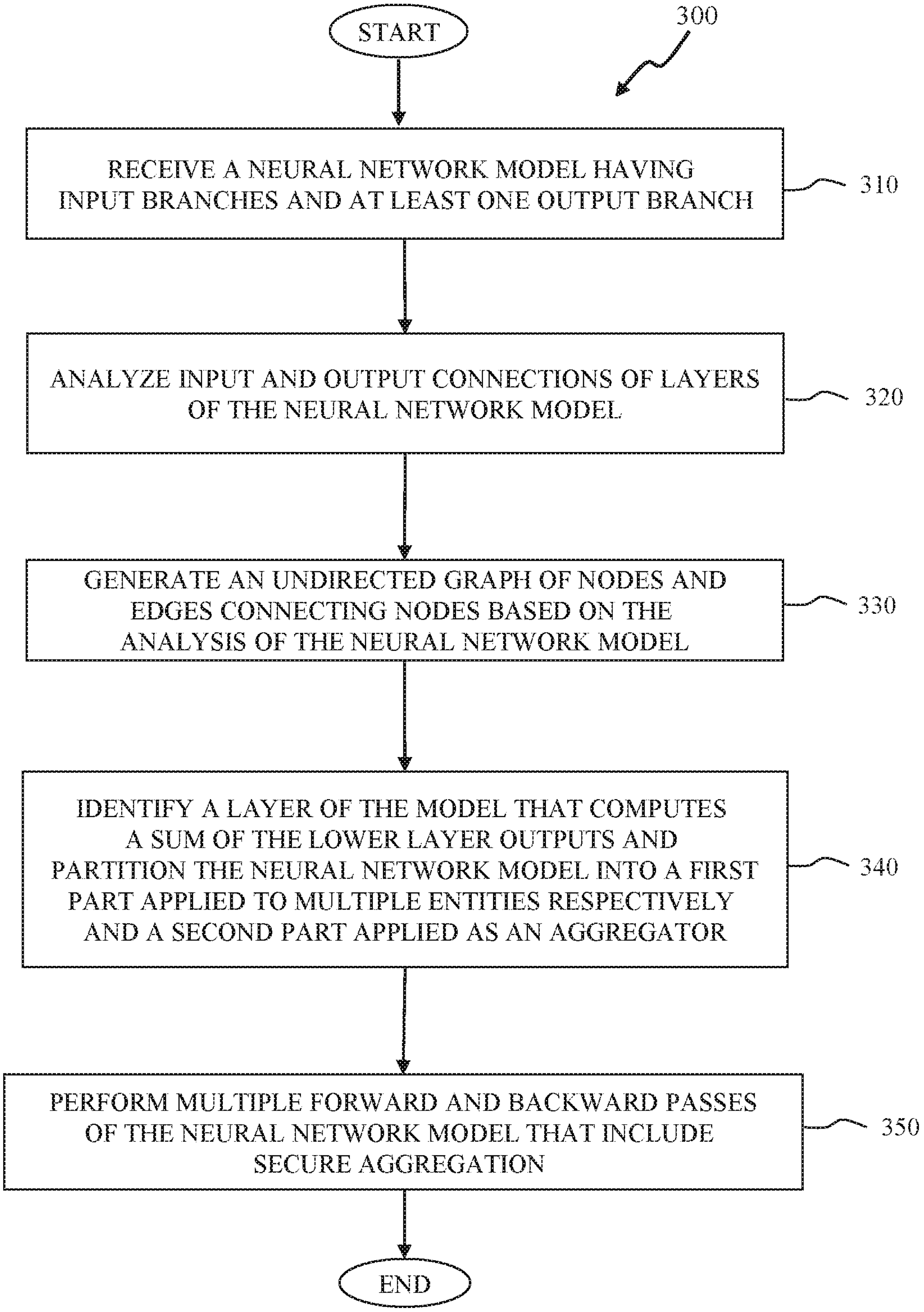
FIG. 3 is a flowchart depicting the operational steps of a partition program, in accordance with embodiments of the present invention.

FIG. 3 is a flowchart depicting operational steps of partition program 300, in accordance with embodiments of the present invention. Partition program 300 enables secure vertical federated learning of a model during training by partitioning a model configured for a set of multiple entities that provide private feature data that is aggregated using secure aggregation methods. The set of entities participates in a collaboration of model training that utilizes VFL and results in a more accurate and effective prediction model that would be possible by each entity training the model only on their respective private data.

Partition program 300 receives a neural network model having input branches and at least one output branch (step 310). Partition program 300 receives a neural network (NN) model as input. In some embodiments, the NN model is created by a user with modeling expertise and includes multiple local branches corresponding to the number of entities participating in VFL of the model training and includes the dimension of feature space on each entity. The received model also includes a global output branch or top layer aggregator output branch.

For example, an expert data scientist creates a neural network model that accommodates a first, second, and third entity to collaborate in training the model using VFL. The model takes into account the data types that may vary between entities and the variations in determining the dimension of feature space for each entity. Partition program 300 receives the NN model.

Partition program 300 analyzes the input and output connections of layers of the neural network model (step 320). Partition program 300 performs an analysis of the input and output connections of the neural network layers of the model. The analysis includes identifying the points of connection of multiple inputs and combinations of the connection of multiple entities with an output of an additional entity from the set of multiple entities. The connection point analysis includes determining connections for all entities associated with providing feature data for the NN model training.

For example, partition program 300 analyzes the number of entity inputs and outputs of the NN model at the entity layer of the model and determines pairings of the entity outputs as an initial layer of connection. Partition program 300 determines the connections that include all the entities contributing training data connected in pairings from the analysis.

Partition program 300 generates an undirected graph of nodes and edges connecting nodes based on the analysis of the neural network model (step 330). Partition program 300 generates a graph in which the nodes of the graph correspond to the connection points identified in the analysis of the NN model. In an embodiment of the present invention, partition program 300 identifies the nodes in the undirected graph having more than one child node as representing an aggregation operation of data in the NN model.

For example, partition program 300 generates an undirected graph that includes output at each of 4 local entities. The undirected graph includes a first connection between the first and second entity output, which has more than one child node as input. The first connection corresponds to an aggregation operation of the outputs of entities one and two. Additionally, partition program 300 determines that there is a connection between the first connection (i.e., the output of entity 1 and entity 2 inputs) and the output of entity 3, forming a second connection node with more than one child node and representing an aggregation operation. Partition program 300 determines that the second connection node has a connection with the output of entity four, forming a third connection node and including an aggregation operation.

Partition program 300 identifies a layer of the model that computes a sum of the lower layer outputs and partitions the identified neural network model layer into a first part applied to the multiple entities, respectively, and a second part applied to a global or top layer aggregator (step 340). Having analyzed the NN model and determining the connections and aggregation operations in the undirected graphs, partition program 300 identifies a layer (or layers) of the model in which a sum is computed from the lower layer outputs. Partition program 300 partitions the identified NN model layer corresponding to the connection nodes determined to have aggregation operations (i.e., having more than one child node as inputs) into two parts and deploys a first part of the partitioned model onto the entities participating in training the model. The model partition placed on the local entities includes a block-wise multiplication of the lower layer's outputs with the weight matrix of the trainable parameters, with each entity generating respective weights for input data. Partition program 300 places the second part of the partitioned NN model on an aggregator such as an edge server aggregator or cloud aggregator.

For example, partition program 300 partitions a layer of the NN model that computes a sum of the outputs of the preceding layer. Partition program 300 places the first partition on entity 1, entity 2, and entity 3, producing outputs 120, 124, and 128 (FIG. 1). Partition program 300 places the second partition, such as partition model 117 and 119 on edge server 160 and cloud server 110. In some embodiments, partition models 117 and 119 are different parts of the NN model and may have different architectures and weights. Outputs 120 and 124 are configured with trainable parameters to form inputs 130 and 134 making output 138 a connection having more than one child and having an aggregation operation. Similarly, input 140 is formed by configuring output 138 with trainable parameters, and input 144 is formed by configuring entity 3 output 128 with trainable parameters. Partition model 119 receives input 140 and input 144, defining a connection point having more than one child node and, therefore, an aggregation operation that results in output 148.

Partition program 300 performs multiple forward and backward passes of the neural network model that include secure aggregation (step 350). It is noted that partition program 300, as depicted in FIG. 1, operates in a cloud server environment; however, the forward and backward passes of the model as performed by partition program 300 are not done only within the cloud server, but also involve all participating entities (i.e., entity servers) and may involve edge servers. Partition program 300 performs multiple forward and backward passes in which the trainable parameters are modified to fully train the NN model based on using VFL from a collaboration of vertical silos of training data from multiple entities. The forward and backward passes maintain the partitions created and include utilizing secure aggregation methods in which the input data includes noise added in a manner between communicating pairs of entities such that the added noise protects the raw feature data from detection by the aggregating servers and the aggregation operations cancel out the added noise terms.

For example, partition program 300 performs secure aggregation and applies weights to outputs 120 and 124 of entities 1 and 2 from partition models 113*a* and 113*b*, which results in input 130 and input 134. Partition program 300 performs an aggregation operation within partition model 117 resulting in output 138 of edge server 160. Secure aggregation input 140 of edge server 160 is securely aggregated with output 128 of entity 3, which is configured with trainable parameters forming input 144. Inputs 140 and 144 are securely aggregated in partition model 119 operating on cloud server 110.

The backward pass of the multiple passes of the NN model includes computing a loss function in which the server computes the partial derivative that is passed to the local entities for additional computations. The forward and backward passes of the NN model provide modifications to the trainable parameters applied to the model inputs to minimize error and maximize accuracy for a trained model with improved predictability. Embodiments of the present invention apply to scenarios with a hierarchy of multiple levels, such as hybrid cloud/edge environments.

Figure 4:
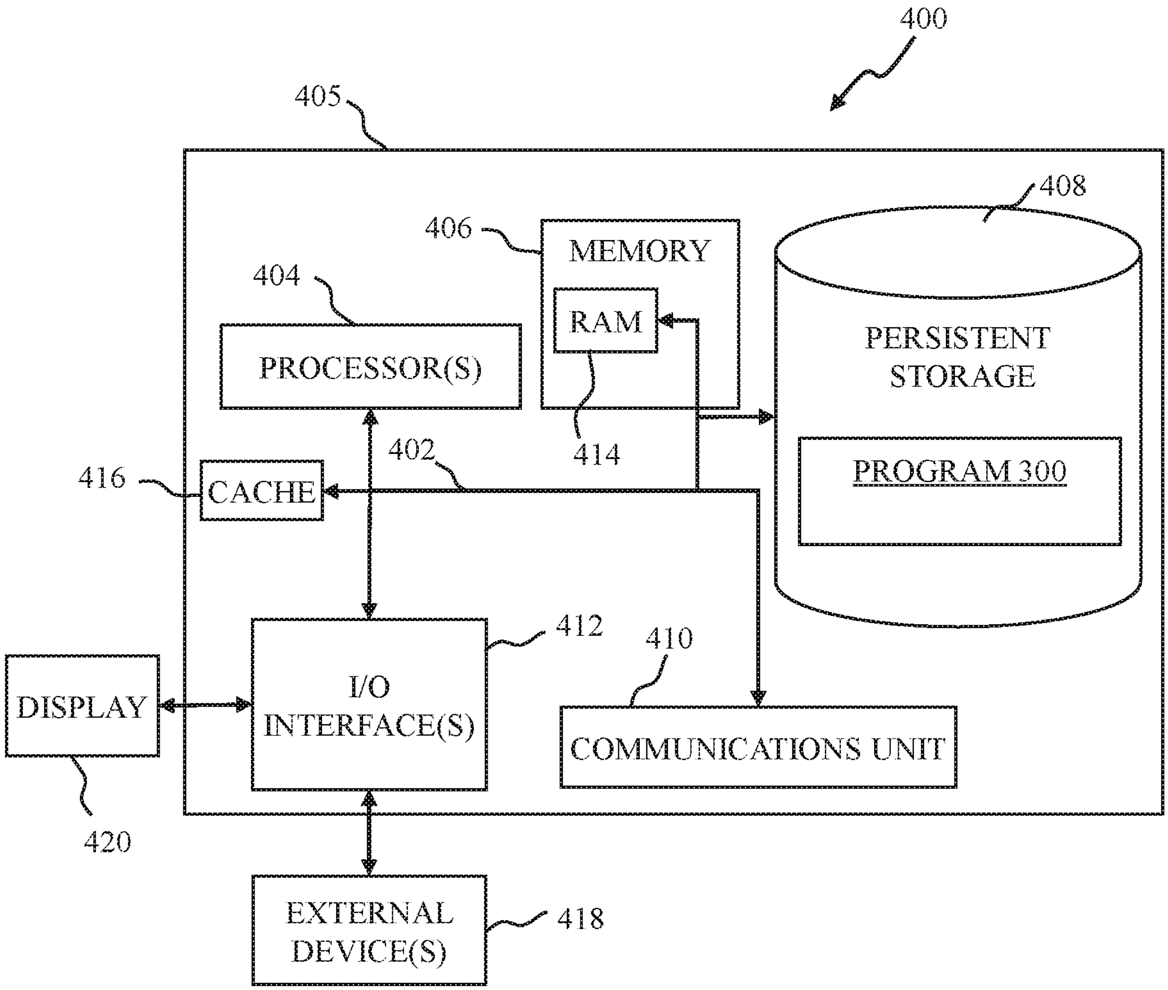
FIG. 4 depicts a block diagram of components of a computing system, including a computing device configured to operationally perform the partition program of FIG. 3, in accordance with an embodiment of the present invention.

FIG. 4 depicts a block diagram of components of a computing system, including computing device 405, configured to include or operationally connect to components depicted in FIG. 1, and with the capability to operationally perform partition program 300 of FIG. 3, in accordance with an embodiment of the present invention.

Computing device 405 includes components and functional capability similar to components of cloud server 110 and customer computing devices 163, 165, and 167, (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, partition program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Partition program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., partition program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for training a neural network model using vertical federated learning, the method comprising:

analyzing an architecture of input and output connections of layers of a neural network model that are received, wherein the neural network model is structured to receive input from vertically partitioned data across multiple entities;

generating an undirected graph of nodes in which a node having two or more child nodes includes an aggregation operation, based on the analysis of the architecture of the neural network model in which an output of a layer of the neural network model corresponds to a node of the graph;

identifying the layer of the neural network model in which a sum of lower layer outputs is computed;

partitioning the identified neural network model layer into a first part applied respectively to the multiple entities and a second part applied to an aggregator;

adding a noise term to the lower layer outputs of at least a pair of entity inputs of the multiple entities, which are configured as inputs to an aggregation operation performed by a first part partition of the neural network model, wherein generation of the noise term includes coordination between the at least two lower layer outputs through a secure communication channel such that the noise terms cancel out as a result of computing a sum of all noise terms;

performing the aggregation operation between at least two of the lower layer outputs; and performing multiple forward and backward passes of the neural network model including application of secure aggregation in the multiple forward and backward passes, respectively.

2. The method of claim 1, further comprising:

receiving the lower layer outputs of a neural network model partition applied to a first entity and a second entity as inputs to a first-level aggregation operation that results in a first-level output;

receiving the first-level output and output of a third entity as input to a second-level aggregation operation that results in a second-level output; and receiving the second-level output and output of a fourth entity as input to a third-level aggregation operation.

3. The method of claim 1, wherein the first part partition of the partitioned neural network model performs a multiplication of respective outputs of the multiple entities with a weight matrix portion associated respectively with the multiple entities.

4. The method of claim 1, wherein a second part of the partitioned neural network model computes a sum of a respective entity output multiplication results followed by an activation function.

5. The method of claim 1, wherein the multiple forward and backward passes of the neural network model preserve the partitioning of the neural network model by computing the multiple forward and backward passes in a distributed manner across the multiple entities.

6. The method of claim 1, wherein the partitioning of the neural network model includes identifying a layer of the neural network model that performs a sum of outputs of a preceding layer.

7. The method of claim 1, where the partitioning of the neural network model identifies a node as a single building block that sums outputs of preceding building blocks, and initial preceding building blocks correspond to the multiple entities.

8. The method of claim 1, where the partitioning is performed automatically and includes decomposing an identified single building block so that the first part partition of a partition of the neural network model includes computing a partial matrix product on a preceding building block output of each entity of the multiple entities, and the second part of the partition of the neural network model includes computing a sum of a result from the first part followed by additional computation of an activation function.

9. A computer system for training a neural network model using vertical federated learning, the computer system comprising:

one or more computer processors;

at least one computer-readable storage medium;

program instructions stored on the at least one computer-readable storage medium, the program instructions comprising:

program instructions to analyze an architecture of input and output connections of layers of a neural network model that are received, wherein the neural network model is structured to receive input from vertically partitioned data across multiple entities;

program instructions to generate an undirected graph of nodes in which a node having two or more child nodes includes an aggregation operation, based on the analysis of the architecture of the neural network model in which an output of a layer of the neural network model corresponds to a node of the graph;

program instructions to identify the layer of the neural network model in which a sum of lower layer outputs is computed;

program instructions to partition the identified neural network model layer into a first part applied respectively to the multiple entities and a second part applied to an aggregator;

program instructions to add a noise term to the lower layer outputs of at least a pair of entity inputs of the multiple entities, which are configured as inputs to an aggregation operation performed by a first part partition of the neural network model, wherein generation of the noise term includes coordination between the at least two lower layer outputs through a secure communication channel such that the noise terms cancel out as a result of computing a sum of all noise terms;

program instructions to perform the aggregation operation between at least two of the lower layer outputs; and program instructions to perform multiple forward and backward passes of the neural network model including application of secure aggregation in the multiple forward and backward passes, respectively.

10. The computer system of claim 9, further comprising:

program instructions to receive the lower layer outputs of a neural network model partition applied to a first entity and a second entity as inputs to a first-level aggregation operation that results in a first-level output;

program instructions to receive the first-level output and output of a third entity as input to a second-level aggregation operation that results in a second-level output; and program instructions to receive the second-level output and output of a fourth entity as input to a third-level aggregation operation.

11. The computer system of claim 9, wherein program instructions for the first part partition of the partitioned neural network model perform a multiplication of respective outputs of the multiple entities with a weight matrix portion associated respectively with the multiple entities.

12. The computer system of claim 9, wherein the program instructions to perform multiple forward and backward passes of the neural network model preserve the partitioning of the neural network model by computing the multiple forward and backward passes in a distributed manner across the multiple entities.

13. The computer system of claim 9, wherein the program instructions to perform the partitioning of the neural network model identifies a node as a single building block that sums outputs of preceding building blocks, and initial preceding building blocks correspond to the multiple entities.

14. The computer system of claim 9, wherein the program instructions to perform the partitioning of the neural network model are performed automatically and include decomposing an identified single building block so that the first part partition of a partition of the neural network model includes computing a partial matrix product on a preceding building block output of each entity of the multiple entities, and the second part of the partition of the neural network model includes computing a sum of a result from the first part followed by additional computation of an activation function.

15. A computer program product for training a neural network model using vertical federated learning, the computer system comprising:

at least one computer-readable storage medium; and program instructions stored on the at least one computer-readable storage medium, the program instructions comprising:

program instructions to analyze an architecture of input and output connections of layers of a neural network model that is received, wherein the neural network model is structured to receive input from vertically partitioned data across multiple entities;

program instructions to generate an undirected graph of nodes in which a node having two or more child nodes includes an aggregation operation, based on the analysis of the architecture of the neural network model in which an output of a layer of the neural network model corresponds to a node of the graph;

program instructions to identify the layer of the neural network model in which a sum of lower layer outputs is computed;

program instructions to partition the identified neural network model layer into a first part applied respectively to the multiple entities and a second part applied to an aggregator;

program instructions to add a noise term to the lower layer outputs of at least a pair of entity inputs of the multiple entities, which are configured as inputs to an aggregation operation performed by a first part partition of the neural network model, wherein generation of the noise term includes coordination between the at least two lower layer outputs through a secure communication channel such that the noise terms cancel out as a result of computing a sum of all noise terms;

program instructions to perform the aggregation operation between at least two of the lower layer outputs; and program instructions to perform multiple forward and backward passes of the neural network model including application of secure aggregation in the multiple forward and backward passes, respectively.

16. The computer program product of claim 15, further comprising:

program instructions to receive the lower layer outputs of a neural network model partition applied to a first entity and a second entity as inputs to a first-level aggregation operation that results in a first-level output;

program instructions to receive the first-level output and output of a third entity as input to a second-level aggregation operation that results in a second-level output; and program instructions to receive the second-level output and output of a fourth entity as input to a third-level aggregation operation.

17. The computer program product of claim 15, wherein the program instructions to perform multiple forward and backward passes of the neural network model preserve the partitioning of the neural network model by computing the multiple forward and backward passes in a distributed manner across the multiple entities.

* * * * *